United States Patent
Wang et al.

(10) Patent No.: US 7,413,001 B2
(45) Date of Patent: Aug. 19, 2008

(54) SYNTHETIC MODEL CASTING

(75) Inventors: Hsin-Pang Wang, Rexford, NY (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 11/130,443

(22) Filed: May 16, 2005

(65) Prior Publication Data

US 2005/0205232 A1   Sep. 22, 2005

Related U.S. Application Data

(63) Continuation of application No. 10/885,142, filed on Jul. 6, 2004, now abandoned, and a continuation-in-part of application No. 10/617,552, filed on Jul. 10, 2003, now abandoned.

(51) Int. Cl.
 *B22C 9/00* (2006.01)
 *B22C 9/10* (2006.01)
(52) U.S. Cl. .................. 164/516; 164/361; 164/369
(58) Field of Classification Search ............... 164/4.1, 164/516, 34, 35, 361, 369, 28, 228
 See application file for complete search history.

(56) References Cited

U.S. PATENT DOCUMENTS

| | | | |
|---|---|---|---|
| 3,263,957 A | 8/1966 | Lirones | |
| 4,421,153 A * | 12/1983 | Wilkinson et al. | ............ 164/35 |
| 4,575,330 A | 3/1986 | Hull | |
| 4,844,144 A | 7/1989 | Murphy et al. | |
| 5,136,515 A | 8/1992 | Helinski | |
| 5,484,258 A | 1/1996 | Isburgh et al. | |
| 5,660,524 A | 8/1997 | Lee et al. | |
| 5,740,051 A | 4/1998 | Sanders et al. | |
| 5,824,250 A | 10/1998 | Whalen et al. | |
| 5,868,194 A * | 2/1999 | Horwood | .................... 164/456 |
| 6,051,179 A | 4/2000 | Hagenau | |
| 6,068,806 A | 5/2000 | Dietrich | |
| 6,126,396 A | 10/2000 | Doughty et al. | |
| 6,152,211 A | 11/2000 | Klug et al. | |
| 6,174,133 B1 | 1/2001 | Bunker | |

(Continued)

FOREIGN PATENT DOCUMENTS

EP   0 250 121 A2   12/1987

(Continued)

OTHER PUBLICATIONS

Takashi, "Fabrication of Three Dimensional Ojects Using Laser Lithography," Systems & Computers in Japan, Wiley, Hoboken, NJ, USA, vol. 20, No. 3, Mar. 1, 1989, pp. 58-66.

(Continued)

*Primary Examiner*—Kevin P Kerns
(74) *Attorney, Agent, or Firm*—William S. Andes; Francis L. Conte

(57) ABSTRACT

A synthetic model of a component is created from a 3-D numerical model thereof. A core is then cast inside the synthetic model. The synthetic model may then be removed from the cast core, and then the cast core is used for casting an authentic component therearound. The core is removed from inside the authentic component, which authentic component precisely matches the original synthetic model therefor.

32 Claims, 11 Drawing Sheets

U.S. PATENT DOCUMENTS

| | | | |
|---|---|---|---|
| 6,255,000 B1 * | 7/2001 | O'Connor et al. | 428/586 |
| 6,257,831 B1 | 7/2001 | Papple et al. | |
| 6,331,267 B1 | 12/2001 | Lee et al. | |
| 6,368,525 B1 | 4/2002 | Klug et al. | |
| 6,375,880 B1 * | 4/2002 | Cooper et al. | 264/138 |
| 6,502,801 B2 | 1/2003 | Lee et al. | |
| 6,571,484 B2 | 6/2003 | Hastilow | |
| 6,609,043 B1 | 8/2003 | Zoia et al. | |
| 6,626,230 B1 * | 9/2003 | Woodrum et al. | 164/516 |
| 2002/0187065 A1 | 12/2002 | Amaya et al. | |
| 2005/0156361 A1 | 7/2005 | Holowczak et al. | |
| 2005/0258577 A1 | 11/2005 | Holowczak et al. | |

FOREIGN PATENT DOCUMENTS

| | | |
|---|---|---|
| FR | 2567668 | 1/1986 |
| FR | 2654538 | 5/1991 |
| JP | 60247515 | 5/1984 |
| JP | 61114818 | 2/1986 |
| JP | 01157742 | 6/1989 |
| JP | 05305386 | 11/1993 |

OTHER PUBLICATIONS

Disclosed Anonymously, "A Method of Generating Casting Tooling Using Negative Stereolithographic Solid Modeling," Research Disclosure, Kenneth Mason Publications, Hampshire, GB, vol. 325, No. 23, May 1991.

Behrendt et al, "The EOS rapid prototyping concept," Computers in Industry, Elsevier Science Publishers, Amsterdam, NL, vol. 28, No. 1, Dec. 1, 1995, pp. 57-61.

Ashley, "Rapid Mold-Making for Investment Casting," Mechanical Engineering, ASME, New York, vol. 114, No. 11, Nov. 1, 1992, pp. 49-51.

The ProtoFunctional Materials Company, "Somos 8100 Epoxy Photopolymer," 1-page brochure, Jun. 2004.

* cited by examiner

SYNTHETIC MODEL CASTING

This application is a Continuation of copending prior application Ser. No. 10/885,142; filed Jul. 6, 2004; and a Continuation-in-Part of copending prior application Ser. No. 10/617,552; filed Jul. 10, 2003, both prior applications being hereby incorporated herein by reference, and both prior applications now being abandoned.

BACKGROUND OF THE INVENTION

The present invention relates generally to manufacturing processes, and, more specifically, to casting.

Investment casting or the lost-wax process is used for forming complex three dimensional (3-D) components of a suitable material such as metal. An exemplary cast component is the typical turbine rotor blade of gas turbine engine.

A turbine blade includes an airfoil integrally joined at its root with a blade platform below which is integrally joined a multilobed supporting dovetail. The airfoil is hollow and includes one or more radial channels extending along the span thereof that commence inside the blade dovetail which has one or more inlets for receiving pressurized cooling air during operation in the engine.

The airfoil may have various forms of intricate cooling circuits therein for tailoring cooling of the different portions of the opposite pressure and suction sides of the airfoil between the leading and trailing edges thereof and from the root at the platform to the radially outer tip.

Complex cooling circuits include a dedicated channel inside the airfoil along the leading edge for providing internal impingement cooling thereof. A dedicated channel along the thin trailing edge of the airfoil provides dedicated cooling thereof. And, a multi-pass serpentine channel may be disposed in the middle of the airfoil between the leading and trailing edges. The three cooling circuits of the airfoil have corresponding inlets extending through the blade dovetail for separately receiving pressurized cooling air.

The cooling channels inside the airfoil may include local features such as short turbulator ribs or pins for increasing the heat transfer between the heated sidewalls of the airfoil and the internal cooling air. The partitions or bridges which separate the radial channels of the airfoil may include small bypass holes therethrough such as the typical impingement cooling holes extending through the forward bridge of the airfoil for impingement cooling the inside of the leading edge during operation.

Such turbine blades are typically manufactured from high strength, superalloy metal materials in conventional casting processes. In the common investment casting or lost-wax casting process, a precision ceramic core is first manufactured to conform with the intricate cooling passages desired inside the turbine blade. A precision die or mold is also created which defines the precise 3-D external surface of the turbine blade including its airfoil, platform, and integral dovetail.

The ceramic core is assembled inside two die halves which form a space or void therebetween that defines the resulting metal portions of the blade. Wax is injected into the assembled dies to fill the void and surround the ceramic core encapsulated therein. The two die halves are split apart and removed from the molded wax. The molded wax has the precise configuration of the desired blade and is then coated with a ceramic material to form a surrounding ceramic shell.

The wax is melted and removed from the shell leaving a corresponding void or space between the ceramic shell and the internal ceramic core. Molten metal is then poured into the shell to fill the void therein and again encapsulate the ceramic core contained in the shell.

The molten metal is cooled and solidifies, and then the external shell and internal core are suitably removed leaving behind the desired metallic turbine blade in which the internal cooling passages are found.

The cast turbine blade may then undergo subsequent manufacturing process such as the drilling of suitable rows of film cooling holes through the sidewalls of the airfoil as desired for providing outlets for the internally channeled cooling air which then forms a protective cooling air film or blanket over the external surface of the airfoil during operation in the gas turbine engine.

Gas turbine engine efficiency is increased typically by increasing the temperature of the hot combustion gases generated during operation from which energy is extracted by the turbine blades. The turbine blades are formed of superalloy metals, such as nickel based superalloys, for their enhanced strength at high temperature to increase the durability and useful life of the turbine blades.

The intricate cooling circuits provided inside the airfoils are instrumental in protecting the blades from the hot combustion gases for the desired long life of the blades in an operating turbine engine.

The cooling circuits inside turbine blades are becoming more and more complex and intricate for tailoring the use of the limited pressurized cooling air and maximizing the cooling effectiveness thereof. Any such cooling air bled from the compressor during operation for cooling the turbine blades is not used in the combustion process and correspondingly decreases the overall efficiency of the engine.

Recent developments in improving turbine airfoil cooling include the introduction of double walls therein for enhancing local cooling of the airfoil where desired. The typical airfoil includes main channels such as the dedicated leading edge and trailing edge channels and the multi-pass serpentine such as the dedicated leading edge and trailing edge channels and the multi-pass serpentine channels that provide the primary cooling of the airfoil. These channels are typically defined between the thin pressure and suction sidewalls of the airfoil which may be about 40 to 50 mils thick.

In introducing double wall construction of the airfoil, a thin internal wall is provided between the main sidewalls of the airfoil and the main channels therein to define auxiliary or secondary channels which are relatively narrow. The secondary wall may include impingement holes therethrough for channeling from the main flow channels impingement cooling air against the inner surface of the main sidewalls.

The introduction of the double wall construction and the narrow secondary flow channels adds to the complexity of the already complex ceramic cores used in typical investment casting of turbine blades. Since the ceramic core identically matches the various internal voids in the airfoil which represent the various cooling channels and features thereof, it becomes correspondingly more complex as the cooling circuit increases in complexity.

Each radial channel of the airfoil requires a corresponding radial leg in the ceramic core, and the legs must be suitably interconnected or otherwise supported inside the two dies during the casting process. As the ceramic core legs become thinner, such as for the secondary channels, their strength correspondingly decreases which leads to a reduction in useful yield during the manufacture of the cores that are subject to brittle failure during handling.

Since the ceramic cores are separately manufactured and then assembled inside the two die halves, the relative positioning thereof is subject to corresponding assembly tolerances. The walls of the airfoil are relatively thin to begin with, and the features of the ceramic core are also small and precise. Therefore, the relative position of the ceramic core inside the die halves is subject to assembly tolerances which affect the final dimensions and relative position of the intricate cooling circuit inside the thin walls of the resulting airfoil.

Accordingly, it is desired to provide an improved casting method for 3-D components having intricate internal voids.

BRIEF DESCRIPTION OF THE INVENTION

A synthetic model of a component is created from a 3-D numerical model thereof. A core is then cast inside the synthetic model. The synthetic model may then be removed from the cast core, and then the cast core is used for casting an authentic component therearound. The core is removed from inside the authentic component, which authentic component precisely matches the original synthetic model therefor.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
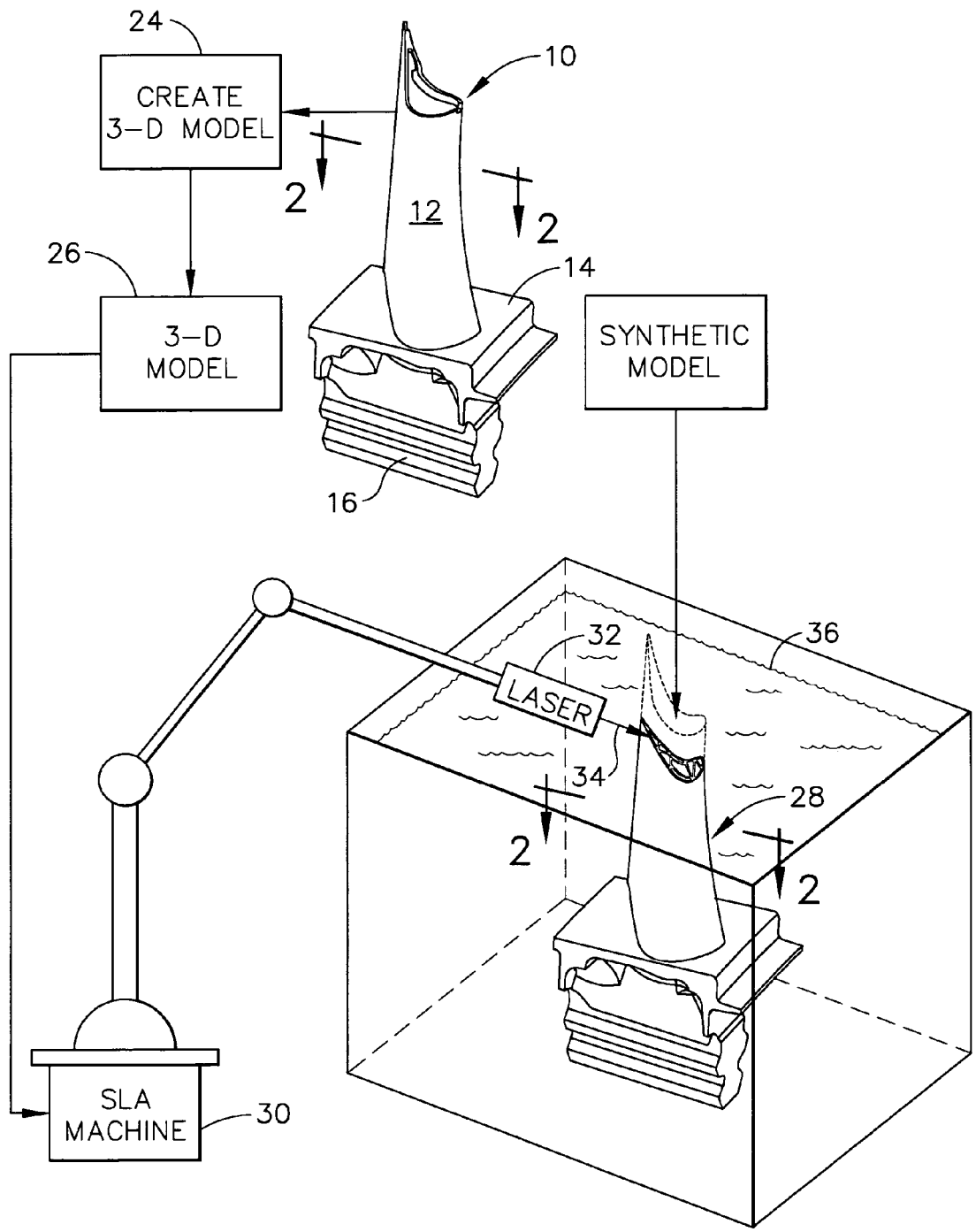
FIG. 1 is a schematic representation of an exemplary method for creating a 3-D numerical model of a hollow turbine blade and a corresponding synthetic model thereof.

Illustrated in FIG. 1 is a component 10 for being replicated by casting. The component may have any suitable configuration for casting, and is in the exemplary embodiment of a turbine rotor blade for a gas turbine engine.

The exemplary turbine blade 10 includes an airfoil 12 having a generally concave pressure side and an opposite generally convex suction side extending in chord between opposite leading and trailing edges, and extending in radial span between a root and an outer tip.

The airfoil is integrally joined to a platform 14 at the root thereof which defines the inner boundary for the hot combustion gases which pass over the airfoil during operation in the engine. A multilobe mounting dovetail 16 is integrally formed below the platform for mounting the blade in a corresponding dovetail slot in the perimeter of a turbine rotor disk (not shown).

The turbine blade illustrated in FIG. 1 has a complex 3-D configuration and external profile as required for its proper use in the gas turbine engine. As illustrated in section in FIG. 2, the airfoil is hollow and includes a suitable internal cooling circuit having multiple radial main channels 18 therein. The main channels are defined between the opposite thin sidewalls of the airfoil and extend over the full span thereof, with inlets extending through the platform and dovetail for receiving pressurized cooling air therethrough in operation in the engine.

Figure 2:
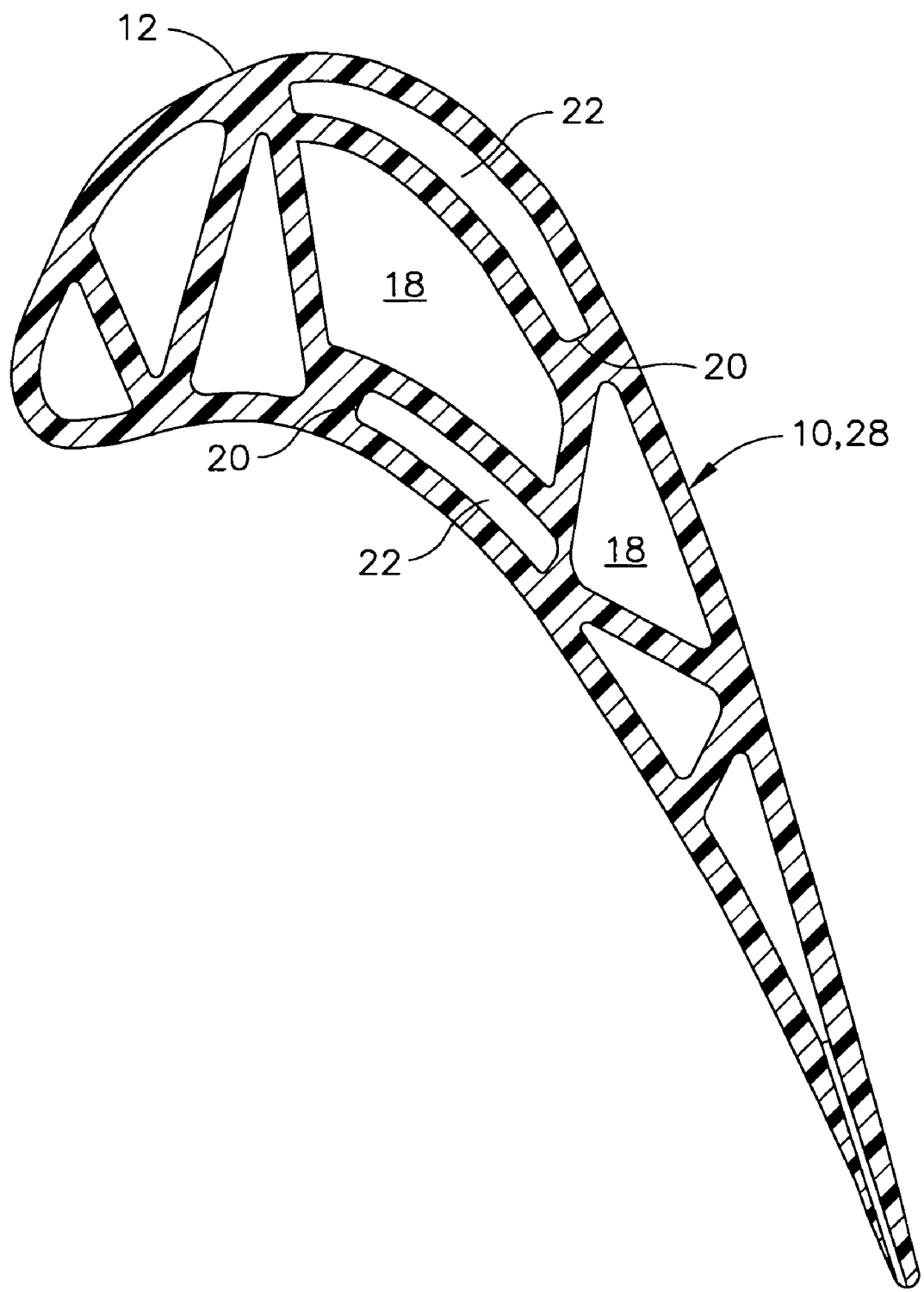
FIG. 2 is a radial sectional view through the airfoil portion of the actual component and synthetic model illustrated in FIG. 1 and taken along line 2-2.

In the exemplary embodiment illustrated in FIG. 2, the airfoil includes in part a double wall 20 along both the pressure and suction sides thereof in which is formed a relatively thin or narrow secondary channel 22 that extends along the radial span of the airfoil. The double wall construction includes the main pressure sidewall or suction sidewall as external walls in combination with a thin parallel inner wall which bounds the main channel 18. The inner wall is spaced closely adjacent to the outer wall to define the narrow secondary channel 22 therebetween, and the inner wall includes rows of impingement holes in flow communication between the channels for providing impingement cooling of the internal surface of the outer wall during operation.

As indicated above, conventional investment casting requires the fabrication of a ceramic core that corresponds with the various channels illustrated in FIG. 2. The main channels 18 are relatively large in size and would result in relatively strong ceramic legs.

However, the secondary channels 22 are relatively narrow and would result in relatively thin ceramic legs which are correspondingly weaker than the main legs. And, the complexity of the multiple main channels and exemplary two secondary channels illustrated in FIG. 2 require the special manufacture of the ceramic core and the multiple legs thereof typically in multiple components which must be later suitably joined together for use in conventional investment casting.

An improved casting method is disclosed hereinbelow which can easily and accurately form the required ceramic core for the multiple channels illustrated in FIG. 2 irrespective of their configurations and relative sizes, including the narrow secondary channels 22 as well.

More specifically, the turbine blade 10 illustrated in FIG. 1 may be designed and defined in any conventional manner including computer aided design (CAD) representations thereof using suitable software programmed into a conventional digital computer 24. It is now common practice in the industry to create 3-D definitions or models of highly complex parts, such as the turbine blade, represented by the three dimensional coordinates of the entire configuration of the component, including external and internal surfaces thereof.

Accordingly, the turbine blade 10 illustrated in FIG. 1 may be conventionally represented by its 3-D numerical model 26 which includes the precise definition of its entire external surface including the airfoil 12, platform 14, and dovetail 16, as well as its internal surface as represented by the various channels 18,22 illustrated in FIG. 2.

In conventional practice, the 3-D model 26 of the turbine blade 10 would be used for creating a conventional ceramic core and complementary external dies (not shown) which would be used for investment casting thereof. However, as indicated above the introduction of the double wall construction inside the airfoil and the narrow secondary channels 22 increases the complexity and cost for conventional investment casting of the blade, while also having reduced yield due to the fragile nature of the thin ceramic legs required to define the secondary channels 22.

In an improved casting process or method, the conventionally created 3-D model 26 of the turbine blade 10 is used to create a 3-D synthetic model 28 of the hollow blade 10.

For example, FIG. 1 illustrates schematically a stereolithography apparatus (SLA) or machine 30 for creating the synthetic model 28 to identically match the authentic or genuine turbine blade 10 being manufactured. The SLA machine 30 may have any conventional configuration and typically includes a laser 32 mounted at the end of a robotic arm which is suitably controlled and positioned in 3-D space by the numerical controller of the machine that is digitally programmable for controlling the various functions thereof.

A suitable SLA material 36, such as a liquid resin, is contained in a pool, and a laser beam 34 is emitted from the laser 32 to locally cure the resin in the pool to create or build the synthetic model 28 therein. The synthetic model is supported on a suitable fixture in the pool and is built layer by layer as the laser beam is precisely guided over the full configuration of the model following the 3-D model 26 stored in the machine 30.

The same numerical model 26 of the authentic turbine blade 10 is used for creating the substantially identical synthetic model 28 in the SLA machine 30, with the resulting two blades being identical to each other except for material composition. The authentic blade 10 illustrated in FIG. 1 is formed of a suitable superalloy metal for the typical gas turbine engine application, whereas the synthetic model 28 of that blade is formed of the suitable SLA material 36 which is cured to solid form by the laser 32.

FIG. 2 illustrates the same radial sectional view for the authentic blade 10 illustrated in FIG. 1 as well as for the synthetic model blade 28 illustrated in FIG. 1, with the former being formed of the superalloy metal and the latter being formed of the synthetic SLA material.

The synthetic model 28 illustrated in FIG. 1 is defined by the solid SLA material and includes the precision external configuration, walls, and surfaces for the entire blade, as well as the precise internal cooling circuit therein including the main and secondary flow channels 18,22 as illustrated in FIG. 2. The precision of definition of the synthetic model 28 may vary as desired for reproducing the various features of the authentic blade with suitable accuracy.

More accuracy in the synthetic model 28 requires more data points in the numerical model 26 which is limited only by the practical use of the model in controlling the SLA machine 30. The individual synthetic model 28 should be formed as quickly as practical for increasing productivity of the overall casting process which requires a considerable number of turbine blades to be manufactured for each gas turbine engine, as well as for multiple engines in practical production runs.

Figure 3:
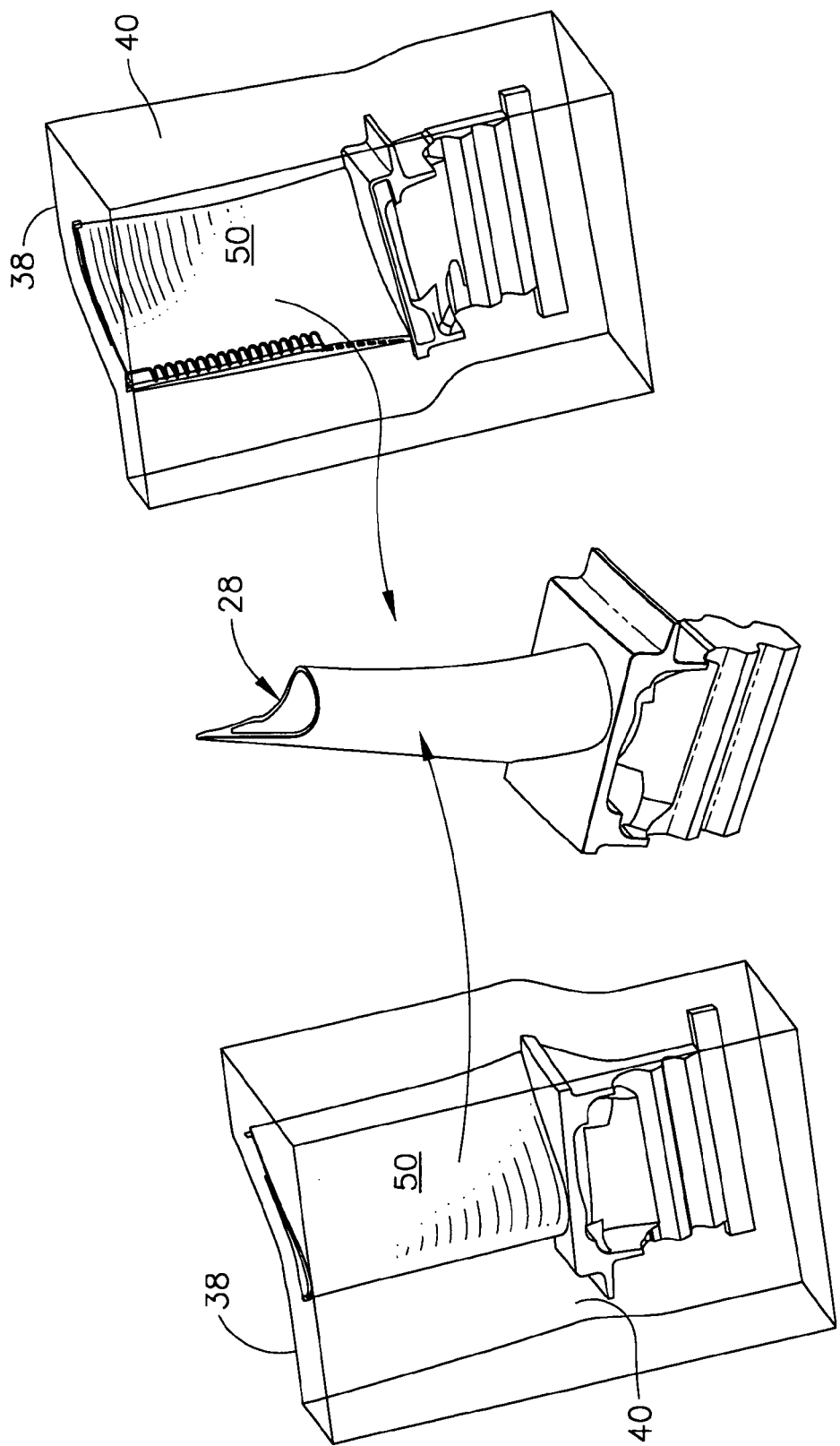
FIG. 3 is an isometric view of the synthetic model illustrated in FIG. 1 being encapsulated in a pair of supporting buttresses.

The 3-D synthetic model 28 is illustrated in FIG. 3 following the fabrication thereof in the SLA machine. Since the SLA material 36 is a low strength non-metallic material, lacking the strength of metal, the synthetic model is preferably buttressed or encapsulated for providing a support or backing structure around the external surface thereof.

Figure 4:
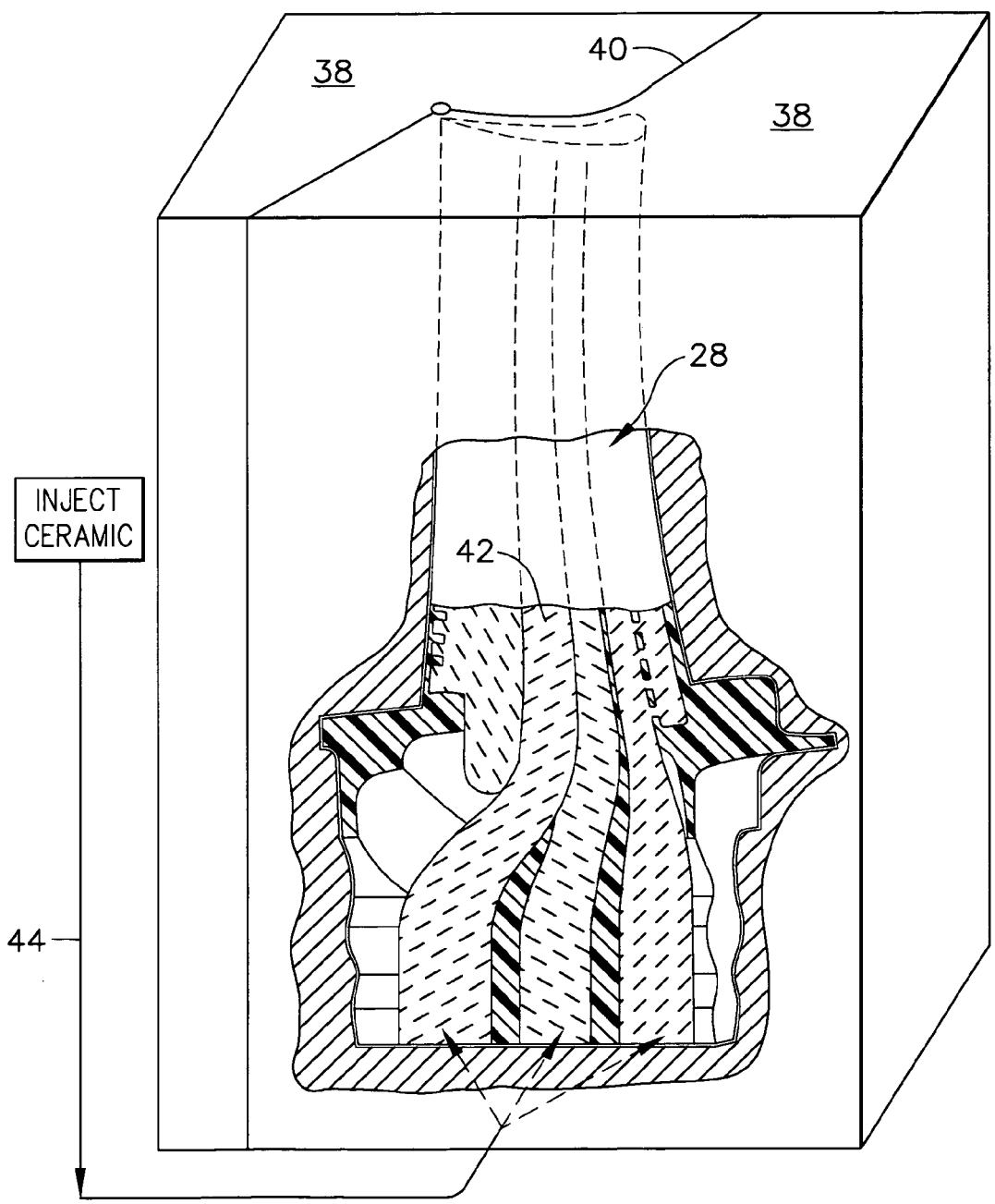
FIG. 4 is a partly sectional, elevational view of the synthetic model illustrated in FIG. 3 encapsulated by the two buttresses and being injected with a ceramic material to fill the internal voids of the synthetic model.

For example, the synthetic model 28 may be buttressed by a pair of complementary backing members or buttresses 38 which encapsulate the synthetic model along a longitudinal splitline 40 as illustrated in FIG. 4. The two buttresses 38 preferably fully encapsulate the synthetic model 28 along its external surface substantially in full, except as required for small inlets and outlets for the subsequent casting process.

The two buttresses 38 are suitably bolted or clamped together around the synthetic model and then a ceramic core 42 may be suitably cast inside the hollow synthetic model to fill the various voids originally provided therein.

The core may be cast by injecting under pressure a suitable core material 44 into the buttressed synthetic model 28 which injected core is then suitably cured by drying and heating for example.

Figure 5:
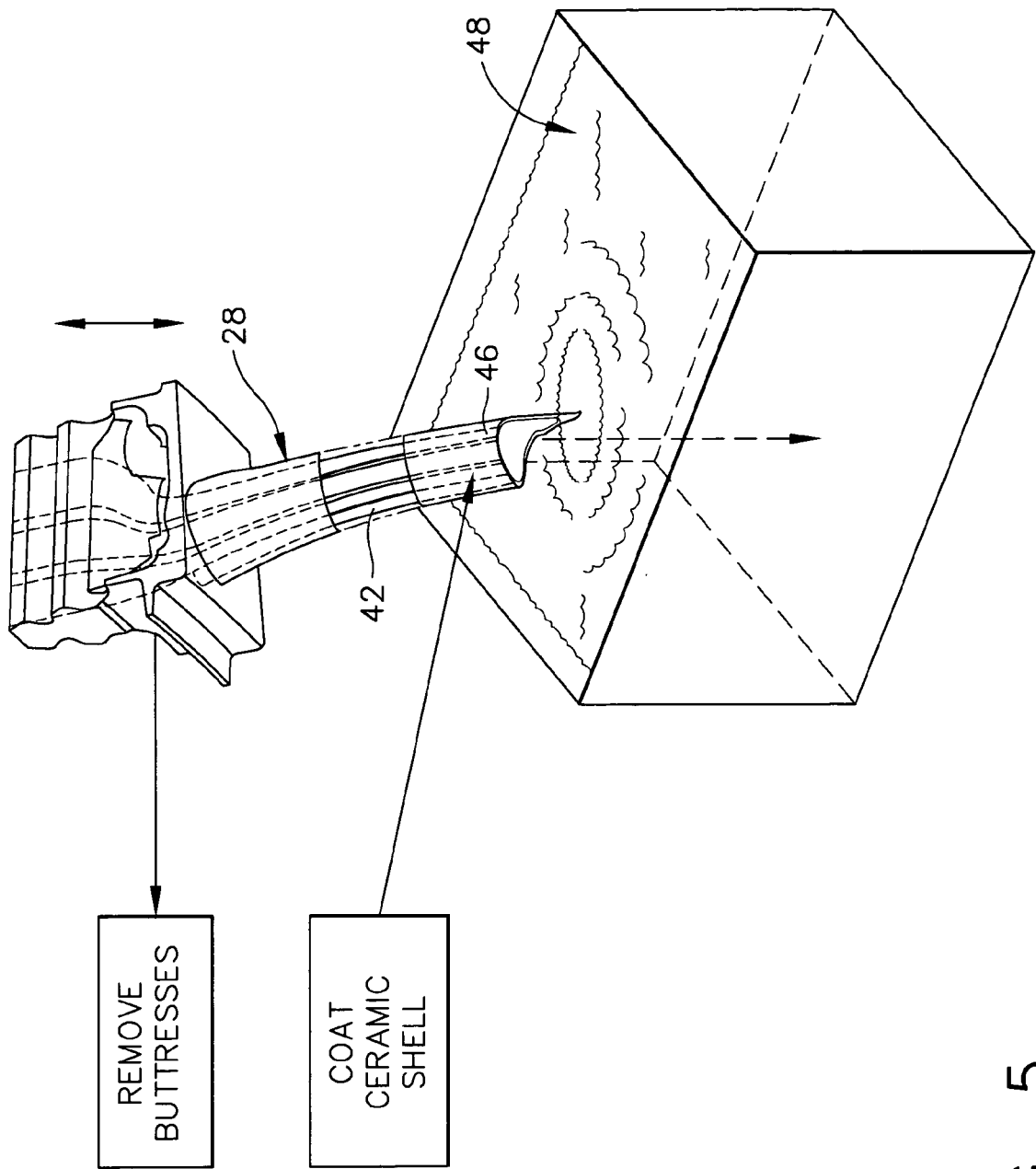
FIG. 5 is a schematic representation of the synthetic model illustrated in FIG. 4 after removal of the two buttresses and undergoing a coating process to form a ceramic shell therearound.

FIG. 5 illustrates schematically that the two buttresses may be suitably removed from the synthetic model 28 after the internal core 42 is formed therein. As indicated above, the two buttresses 38 provide a structural support for the relatively weak synthetic model 28 so that under the injection process for forming the internal core the weak SLA material is not permitted to deform or bulge and distort the desired dimensions thereof.

However, in alternate embodiments the cured or solidified SLA material may have sufficient strength to resist the injection pressure of the core material, and the buttresses may not be necessary in such embodiments.

As shown in FIG. 5, a molding shell 46 may then be formed around the synthetic model 28 after the internal core 42 is cast therein and the external surface of the model becomes exposed without obstruction by the buttresses.

For example, the synthetic model 28 illustrated in FIG. 5 may be dipped in a pool of coating material 48 for coating the model in multiple layers to form the subsequent shell 46 therearound upon curing thereof. The entire synthetic model 28 may be coated layer by layer until a sufficient thickness of the shell 46 is obtained.

In the preferred embodiment illustrated in FIG. 5, the core material 44 is a ceramic slurry suitably injected into the synthetic model 28 to form the ceramic core 42. And, the shell material 48 is also a ceramic slurry for coating the synthetic model 28 to form the encapsulating shell 46 in a unitary configuration. The ceramic material for both the core 42 and the shell 46 may then be suitably cured by drying and heating to solidify the ceramic material in place.

Figure 6:
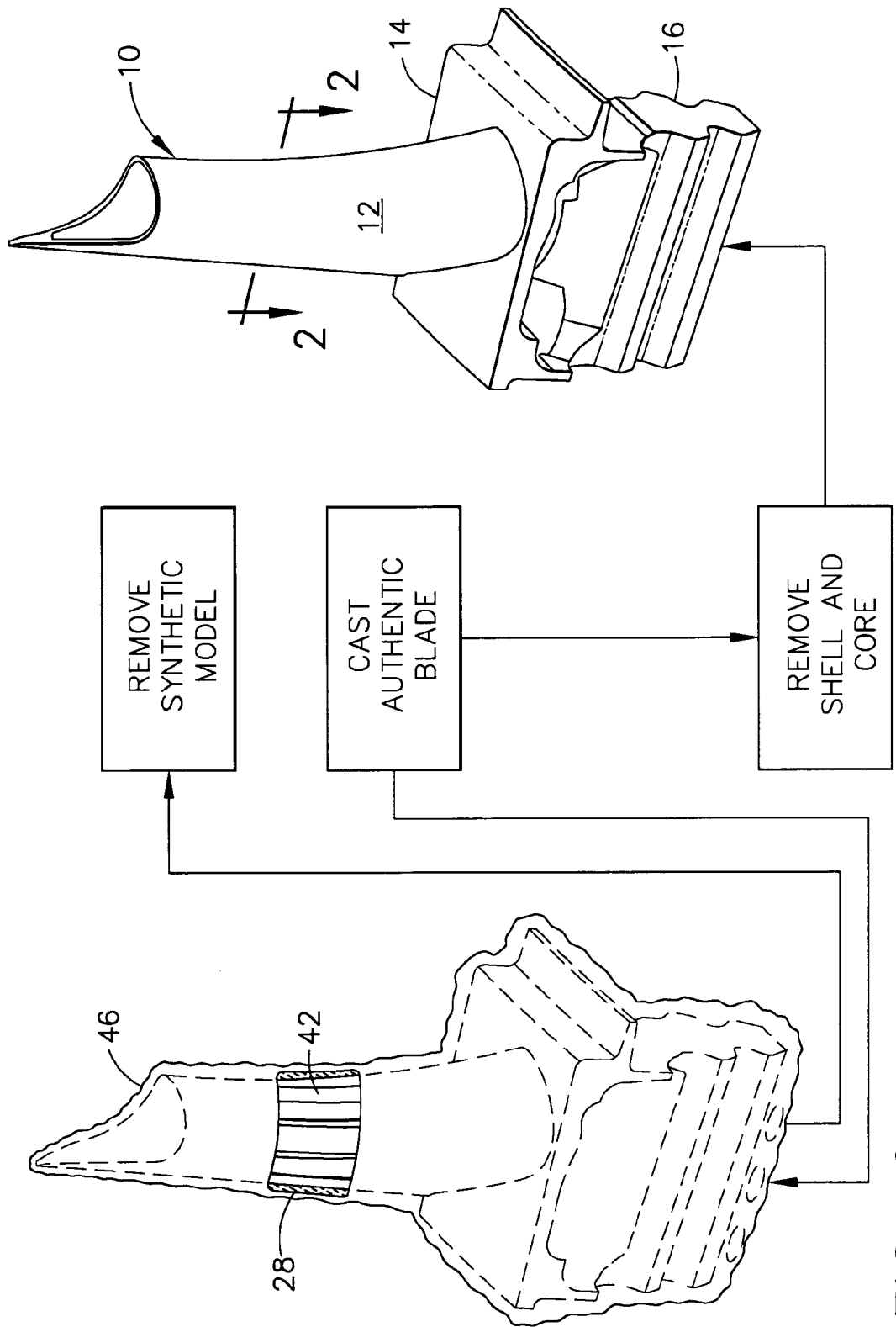
FIG. 6 is a schematic view of the shell-encapsulated synthetic model illustrated in FIG. 5 in which the synthetic model is removed for casting the authentic blade between the shell and core, after which the shell and core are removed to liberate the cast authentic blade.

FIG. 6 illustrates schematically that the synthetic model 28 may be suitably removed from around the ceramic core 42 and from inside the surrounding ceramic shell 46 by melting, burning, dissolving, or any other suitable means for removing the specific form of the SLA material forming the synthetic model. This may be conveniently effected by providing access holes at the base of the encapsulated model 28 which are aligned with the corresponding inlet legs of the ceramic core.

Upon removal of the synthetic model from the shell 46 illustrated in FIG. 6, a corresponding void remains therein surrounding the ceramic core 42 trapped inside the shell. That void corresponds with the precise definition of the metal portions which define the authentic blade 10.

Accordingly, the authentic blade 10 may then be conventionally cast around the core 42 and inside the shell 46 in the same process steps used in the conventional investment casting after removal of the pattern wax. For example, molten metal may be poured through the access holes at the dovetail end of shell 46 to fill by gravity the void inside the shell, which is suitably fixtured in the upside down position. The tip end of the shell 46 may have a suitable outlet aperture for purging air from the shell as the molten material fills the void therein.

The molten material is then allowed to cool and solidify inside the ceramic shell 46 and around the ceramic core 42 to create the authentic blade 10. The shell 46 may then be suitably removed from around the cast blade 10 by breaking or dissolving the brittle ceramic material thereof. Correspondingly, the ceramic core 42 may be suitably removed from inside the cast blade 10 in any conventional manner such as by chemical leaching. In this way, the cast blade 10 is liberated from the encapsulating outer shell 46, and the internal core 42 is removed to form the internal cooling circuit therein.

The so cast blade may then undergo typical post-casting processes, such as drilling of various rows of film cooling holes through the sidewalls thereof.

A particular advantage of using the synthetic model 28 illustrated in FIG. 4 is that the interconnected main channels 18 and secondary channels 22 may be filled in turn by injecting therein the ceramic material 44 to form an integral or unitary ceramic core 42 after curing thereof. All the voids within the entire synthetic model 28 may be readily filled with the ceramic material to accurately form the resulting core which is also accurately positioned within the synthetic model 28 itself.

Correspondingly, after removal of the synthetic model 28 from within the surrounding ceramic shell 46 as illustrated in FIG. 6 the resulting void around the core precisely represents the configuration of the final metallic turbine blade in its authentic or genuine form. Casting the molten material in the shell 46 reproduces identically the synthetic model previously contained therein, with the authentic blade being formed of the intended final material in contrast with the different SLA material of the synthetic model.

Accordingly, the resulting authentic turbine blade 10 illustrated in FIG. 6 accurately replicates the synthetic model 28 itself as well as the original numerical model 26 illustrated in FIG. 1 within the tolerances of that original numerical model. The outer configuration of the turbine blade 10 illustrated in FIG. 6 including the airfoil 12, platform 14, and integral dovetail 16 accurately reproduces the numerical model. And, the internal cooling circuit within the cast turbine blade 10 also accurately reproduces the corresponding circuit represented by the numerical model.

Since the ceramic core 42 is itself molded within the synthetic model 28 its position relative thereto is accurately maintained by the cured SLA material itself. And, the outer configuration of the synthetic model 28 is accurately molded in the encapsulating shell 46. In this way, the ceramic core 42 is accurately positioned inside the ceramic shell 46 for accurately reproducing the corresponding wall thickness in the finally cast blade between the internal and external surfaces thereof.

It is noted that the authentic blade 10 illustrated in FIG. 6 is cast using the ceramic core 42 inside the ceramic shell 46 without for the need for conventional dies typically used in the lost-wax casting process. FIG. 3 illustrates the use of the optional buttresses 38 which are specifically configured to support or back the relatively weak synthetic model 28, and are generally in the form of conventional dies, but do not provide their die function.

More specifically, conventional dies must be formed of suitably strong metal and accurately machined to form the complementary external surfaces of the blade being cast. The conventional dies are repeatedly used in the lost-wax casting process during the intermediate step in which the wax is cast between the core and the dies to precisely form the wax equivalent of the final component or blade.

In contrast, the pre-formed synthetic model 28 illustrated in FIG. 3 accurately represents the final form of the authentic blade within the manufacturing tolerances of the numerical model 26 illustrated in FIG. 1. No wax is used in the present casting process, and therefore conventional dies for such wax are not required.

The synthetic model 28 illustrated in FIG. 3 includes an external surface including the aerodynamic airfoil portion attached to the platform inner boundary supported on the integral dovetail. The external surface of the synthetic model has a first tolerance on dimensions thereof within the desired precision of the numerical model 26 illustrated in FIG. 1. Typically, the external dimensions of the synthetic model 28 and the subsequent authentic blade 10 are specified with a manufacturing tolerance of a few mils or less, with the airfoil portion of the blade being particularly accurate in dimension, configuration, and smooth surface finish.

However, since the buttresses 38 illustrated in FIG. 3 merely provide backing support for the synthetic model during injection under pressure of the ceramic material, they do not require comparable accuracy of manufacture, nor the associated expense thereof. The two complementary buttresses 38 illustrated in FIG. 3 have corresponding internal surfaces 50 which are complementary with the corresponding external surfaces of the synthetic model 28 on its opposite sides.

The splitline 40 may be conveniently located along the camber line of the airfoil and radiates outwardly from the leading and trailing edges thereof. In this way, one of the buttresses may be configured for the concave pressure side of the airfoil and corresponding side of the platform and dovetail, with the other buttress being configured for the convex suction side of the airfoil and corresponding side of the platform and dovetail.

The two buttresses 38 may be formed of a suitable metal for sufficient strength, and the internal surfaces 50 may be machined with a second tolerance on dimensions thereof which can be substantially larger or greater than the first tolerance on dimensions of the synthetic model 28 itself. It is not required that the internal surfaces 50 of the buttresses identically match the corresponding external surfaces of the synthetic model 28, but only generally match those surfaces to sufficiently restrain distortion thereof during the core casting process.

In this way, the buttresses may be formed of less expensive material than conventional metallic dies, and may be machined with less accuracy for significantly reducing the cost thereof, and therefore reducing the cost of casting authentic blades.

As indicated above, the use of the buttresses 38 is optional depending on the strength of the synthetic model 28, the form or configuration of that model and the desired core therein, and the injection pressure for casting the core.

FIG. 1 illustrates the exemplary SLA process of forming the synthetic model 28. Any other conventional process for accurately forming the synthetic model may also be used in which both the internal voids and external surfaces are accurately reproduced for use in the casting process described above.

The turbine blade form of the cast component is a particular example due to the inherent complexity thereof, and the corresponding benefits in improving the accuracy of casting of the blades at reduced cost. Other forms of the component may also be cast to accurately reproduce their external configuration and surfaces, and any desired internal voids or surfaces therein.

Recently, turbine components having multiple airfoil walls have been designed to achieve still further enhanced cooling efficiency. Examples of these designs include those set forth in U.S Pat. Nos. 5,484,258; 5,660,524; 6,126,396; and 6,174,133.

One drawback to such complicated designs is the difficulty and expense involved in investment casting airfoils with multiple walls, because the complexity of the cooling circuits is such that the required mold cores cannot be formed in a single injection into a conventional die. Instead, multiple cores are generally formed by separate injections, followed by assembling the multiple cores into a composite core. This assembly step is time-consuming and introduces a source for variation in the final dimensions of the cast part, particularly in the thickness dimension of the various walls.

Therefore, an alternative method for forming casting cores that allows the formation of an integral core would be advantageous, especially in the fabrication of components having multiple walls. Furthermore, alternative methods for forming articles having multiple walls, where the method is less time-consuming and more repeatable than current methods, would also be advantageous.

Figure 7:
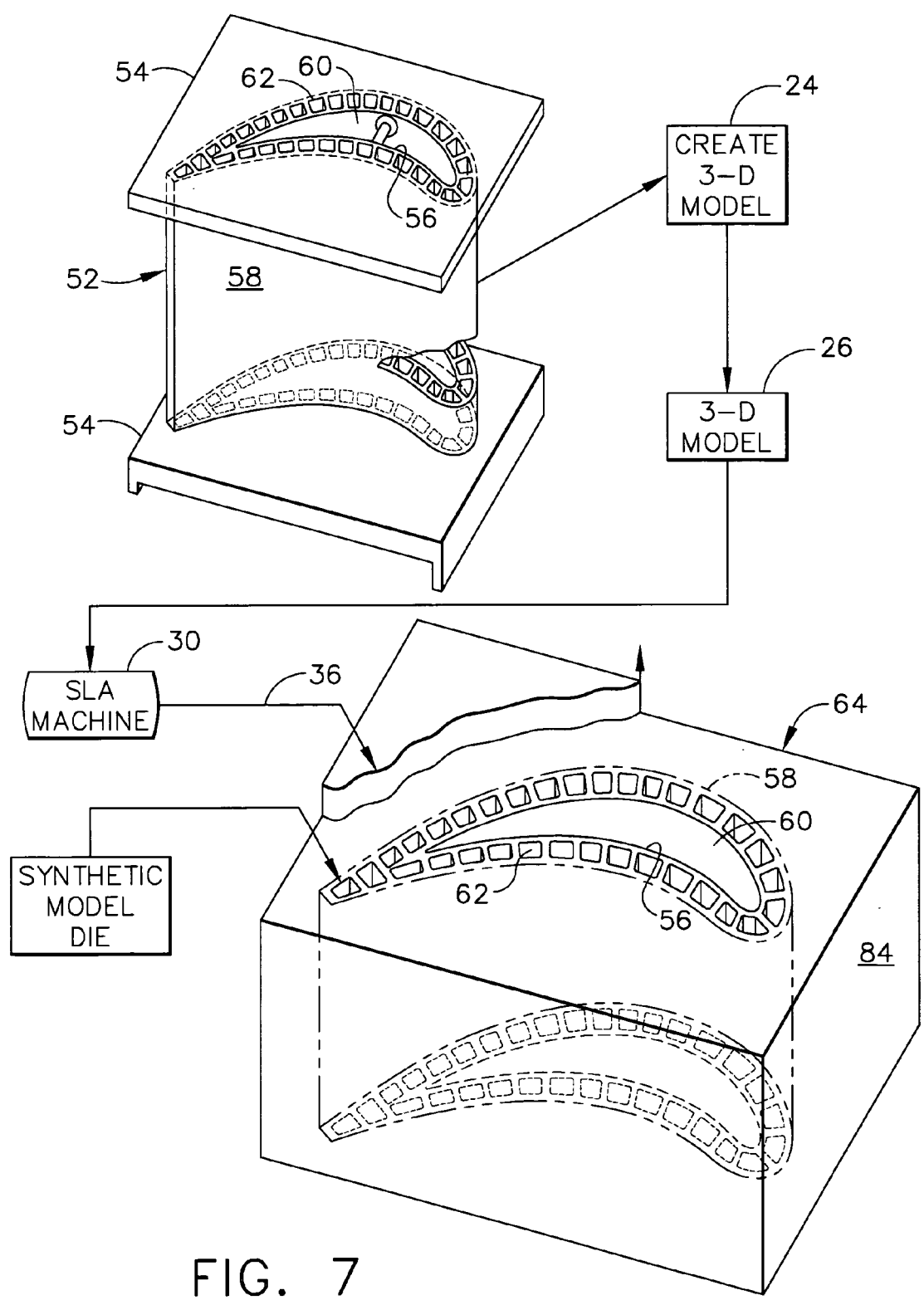
FIG. 7 is a schematic representation of another method for creating a 3-D numerical model of a hollow turbine nozzle vane and a corresponding synthetic model of a core die therefor.

Referring to FIG. 7, a component 52 is made according to method embodiments of the present invention. In particular embodiments, component 52 comprises an external wall 58 and at least one internal wall 56 disposed in a spaced-apart relationship with external wall 58. Such components are referred to herein as multi-wall components.

In the casting method, a single-piece or monolithic sacrificial die is provided. Conventional dies are generally constructed to be used multiple times and are usually two-piece designs, but the complicated geometry of the cooling circuits used in multi-wall components makes the use of dies having two pieces very difficult and often impossible, requiring in conventional methods additional time and effort for multiple injected cores to be formed and assembled into a composite core.

The single-piece sacrificial die comprises at least one internal cavity 60,62. As used hereinafter, the singular term cavity will be used to refer to the at least one cavity or channel within the die, but it should be understood that the use of the singular term cavity also refers to the case where more than one cavity is contained within the die. The shape of the cavity corresponds to the shape desired for the complex mold core to be used in casting the component 52.

According to certain embodiments of the present invention, the single-piece sacrificial die is provided through the use of one or more additive layer manufacturing processes. The die, in particular embodiments, comprises at least one sacrificial material selected from the group consisting of an epoxy, a silicone, and a metal.

In an additive layer process, a product is assembled by producing and sequentially stacking thin cross-sectional layers one on top of the other, generally starting at one end of the product and working towards the opposite end. Such methods often use a three-dimensional computer-aided drafting (CAD) file of the product to guide an automated assembly process, where the CAD model file is digitally partitioned into slices corresponding to the actual layers being generated and stacked, and these slices guide automated assembling equipment such as, for example, robotic arms.

The nature of the additive layer process allows single-piece or unitary articles of high internal complexity, such as, for example, closed internal chambers and tortuous internal channels, to be easily assembled in one continuous operation. Therefore, additive layer manufacturing processes are well suited to the creation of a complicated single-piece die as used in embodiments of the present invention, because such a die will often be designed to have a complicated internal structure that corresponds to the complex internal cooling circuits of the component desired to be cast.

Stereolithography (SLA) is an example of an additive layer process that is suitable for use in embodiments of the present invention. During SLA, a robotic arm holds a laser, and the arm precisely guides the motion of the laser along a motion path described by the sliced CAD file. The laser directs highly focused radiation upon a curable material medium, often a liquid resin, which is instantly solidified (cured) upon exposure to the laser, thereby creating a single, precisely rendered cross-sectional layer of the product that corresponds with the slice of the partitioned CAD file.

This procedure is repeated for all subsequent layers, with each layer being bonded to the previous one by the action of the solidifying material medium. The finished product is a three-dimensional product rendered in cured material with all dimensions in accordance with the CAD file.

A long list of other additive layer manufacturing processes are available in the art and are suitable for providing the single-piece sacrificial die in embodiments of the present invention, including, but not limited to, micro-pen deposition, where liquid media is dispensed with high precision at the pen tip and then cured; selective laser sintering, where a laser is used to sinter a powder media in precisely controlled locations; laser wire deposition, where a wire feedstock is melted by a laser and then deposited and solidified in precise locations to build the product; and fused deposition by extrusion of thin ABS plastic wire in multiple layers to build the product.

Those skilled in the art will appreciate that a variety of curable material media may be applied, including liquid resins, as described above, and solid media in various forms such as powders, wires, and sheets. Silicone-based and organic-based resins are the most common examples of curable material media used in these methods, although in some methods the media comprises at least one metal, often mixed with some type of resin.

A ceramic slurry is introduced into the cavity (or cavities) of the sacrificial die. The slurry comprises a ceramic powder and a liquid phase, or carrier fluid. The slurry contains sufficient liquid phase to provide a viscosity that is usually less than about 10,000 Pascal-seconds, that is, a viscosity that renders the slurry suitable for introduction into, and proper filling of, the die cavity. Suitable ceramics for use in the slurry include, but are not limited to, alumina, yttria, ceria, zirconia, magnesia, and calcia.

In many cases the introduction of the ceramic slurry into the cavity of the die is done with the slurry under pressure to ensure that the slurry completely fills the cavity. Injection molding is an example of a suitable method for introducing the slurry into the die cavity, because the quantity and pressure of the slurry may be precisely controlled as the slurry fills the die cavity.

After the slurry has completely filled the die cavity, the slurry is cured to form a ceramic casting core. Curing the slurry is done by removing the liquid phase, and in certain embodiments this is done by heating the slurry to evaporate the carrier fluid, leaving only the ceramic phase contained within the die cavity.

The die is then removed from around the ceramic casting core contained in the die cavity. Because the die is one piece, it cannot be removed without being destroyed, hence the die is sacrificial in the casting method. The die is exposed to an environment, such as, for example, mechanical stress, temperature, chemicals, and combinations thereof, that is adapted to destroy the die while leaving the ceramic casting core intact.

In certain embodiments, removing the die comprises heating the die. In these embodiments, the die is heated to a temperature that causes the die to decompose or burn away, while the ceramic core remains unaffected.

In some embodiments, the die is removed by dissolving it in a solvent. Those skilled in the art will appreciate that the choice of solvent depends upon the composition of the die.

In some embodiments, the die is chemically removed, such as, for example, by reacting the die material with an acid, base, or other compound or mixture that chemically reacts with and removes the die material. Regardless of how the die is removed, the environment is chosen to selectively remove the die material while leaving the ceramic material intact.

After removing the die, a freestanding, one-piece or monolithic ceramic core remains, suitable for use in investment casting multi-wall components. The ceramic core may be of a much higher complexity than is possible to achieve in a one-piece core made by conventional techniques, due to the use of the single-piece sacrificial die and, in certain embodiments, the use of the additive layer manufacturing process in making the die. The core is often fired at a temperature in the range from about 870° C. to about 1100° C. to provide the core with sufficient strength to survive subsequent operations.

An investment casting process is performed in accordance with industry practice, using the ceramic core made above as part of a mold-core assembly to form component 52. In general, the core and appropriate ancillary material known to those skilled in the art (such as positioning and support pins, sprues, gates, etc.) are disposed in a mold appropriately shaped in accordance with the design of the component to be cast.

Wax is injected into the mold and solidified to form a wax model, and this wax model with embedded core is repeatedly dipped in ceramic slurry to form a ceramic shell mold around the wax pattern. After removing the wax, all that remains is the ceramic core disposed in and attached to the ceramic shell mold, thereby forming the mold-core assembly referred to above.

After casting the component by solidifying molten metal in the mold-core assembly, the ceramic mold is removed by chemical or mechanical means and the core is leached out of the component by a chemical removal agent.

The use of the single-piece sacrificial die to make a one-piece ceramic core, particularly in embodiments employing SLA or other additive layer manufacturing process to make the sacrificial die, allows for repeatable production of high quality castings without the time-consuming steps of forming multiple core components and joining them together into a composite core prior to wax injection.

The method described above is suitable for forming any investment cast article. In some embodiments, the component 52 being made is a component of a turbine assembly, such as, for example, a turbine blade or a vane, including multi-wall blades or vanes. In particular embodiments, component 52 comprises at least one internal air-cooling passage 60,62.

Because the complexity of internal passage geometry is easily accommodated by the additive layer manufacturing process used to fashion the core die, adding additional features to the component is readily accomplished with little added expense. For instance, in certain embodiments, the at least one cooling passage 60,62 of component 52 includes turbulators (not shown) to enhance heat transfer within that cooling passage.

The advantages offered by the present casting method are most apparent when the method is employed to make such complicated, multi-wall components, due to the savings in both time and cost attributable to the use of the single-piece sacrificial die as described above.

For example, one embodiment of the present invention is a method for making a component for a turbine assembly. The component is a multi-wall component, and therefore it comprises an external wall and at least one internal wall disposed in a spaced-apart relationship with the external wall, and further comprises at least one cooling passage disposed between the external wall and the internal wall.

The method comprises using a stereolithography process to provide a single-piece sacrificial die having at least one internal cavity; introducing a ceramic slurry as described previously into the at least one cavity of the die; curing the slurry to form a ceramic casting core; removing the sacrificial die by exposing the die to an environment adapted to destroy the die while leaving the ceramic casting core intact; and performing an investment casting process using the ceramic casting core as part of a mold-core assembly to form the component.

Other embodiments of the present invention include a method for making a casting core, and the casting core made by the method. In this method a single-piece sacrificial die is manufactured using an additive layer manufacturing method as described above. The die comprises at least one internal cavity, into which a ceramic slurry is introduced and then cured. After curing, the die is removed as previously described. The various alternatives for materials and processes described for previous embodiments are equally applicable in this embodiment.

In particular embodiments the core is configured to form internal passages, such as, for example, air-cooling passages, in an investment cast article. That is, the core is designed to correspond with the geometry of these passages, so that when the investment casting process is carried out, the ceramic core will be leached away from the internal surfaces of the component, leaving behind the desired configuration of internal passages. In certain embodiments, the investment cast article for which the core is configured is a component of a turbine assembly, such as, for instance, a multi-wall component.

A further embodiment of the present invention is a die for making a casting core. The die comprises a single piece structure having at least one cavity, and is made of a material capable of being selectively removed from a ceramic casting core when such a core is disposed in the cavity of the die. That is, the die material can be destroyed by an environment while a ceramic casting core disposed within the cavity of the die remains intact, as described previously. In certain embodiments the structure of the die comprises a structure assembled in an additive layer manufacturing process, such as the SLA process described previously.

For example, FIGS. 7-12 illustrate the process for casting another hollow component 52 in the exemplary form of a hollow turbine nozzle vane integrally formed with radially outer and inner bands 54 at opposite ends thereof. The vane is in the form of a typical airfoil having axially opposite leading and trailing edges extending in span between the opposite bands, with a generally concave pressure side, and an opposite, generally convex suction side.

In this embodiment, the pressure and suction sidewalls have double wall configurations including an internal wall 56 surrounded by an external wall 58 having corresponding external surfaces which define the generally concave pressure side of the vane and the generally convex suction side of the vane exposed to the hot combustion gases during operation in a gas turbine engine.

The internal wall 56 defines one or more main internal channels or cavities 60 along the middle of the airfoil which extend along the longitudinal span of the airfoil between the opposite bands.

The double wall configuration defined by the internal and external walls 56,58 also includes a plurality of longitudinally extending secondary internal channels or cavities 62 also extending along the span of the airfoil between the opposite bands. In the exemplary embodiment illustrated in FIG. 7, there are a multitude of relatively narrow secondary channels 62, for example thirty-two channels, spaced transversely apart from each other along the chord direction of the airfoil between the leading and trailing edges which surround a single main channel 60.

Each secondary channel is preferably laterally sealed inside the airfoil double wall along the opposite sides thereof and between adjacent channels and receives cooling air during operation in the gas turbine engine through either or both longitudinal ends, or in any other suitable manner desired. The secondary channels are generally parallel to each other and may be either independent of each other or joined in flow communication therewith for forming serpentine cooling channels of two or more longitudinal legs as desired. The secondary channels may therefore be used for cooling the walls of the vane during operation against the heat load from the hot combustion gases which flow outside the vane.

However, the multitude of secondary channels and their thin, slender configurations substantially increase the difficulty of casting the vanes with conventional investment or lost-wax casting procedures. Since the final turbine vane is typically formed of superalloy metal material having enhanced strength at the elevated temperatures experienced in a gas turbine engine, a corresponding ceramic core must be created for casting the corresponding secondary channels. The ceramic legs corresponding to those secondary channels are therefore extremely thin, brittle, and weak and are subject to easy breakage which would prohibitively reduce the yield thereof in conventional investment casting.

Accordingly, an improved method for casting the exemplary vane component 52 illustrated in FIG. 7 includes creating in a suitable computer 24 the corresponding 3-D numerical model 26 of the actual component 52 to be reproduced. The numerical model includes a locus of three dimensional points over the configuration of the component 52 to accurately cast a reproduction thereof within the desired small tolerances, typically expressed in a few mils. Of particular interest in the numerical model 26 is the precise definition of the internal channels 60,62 and the immediately surrounding internal and external walls 56,58.

The SLA machine 30, or other form of rapid prototyping machine, may then be used for creating or fabricating a synthetic model die 64 of the original component 52 from the 3-D numerical model 26 thereof. The fabricating machine 30 is computer operated for precisely building the synthetic die 64 layer by layer to conform fully with the original component 52 and produce a substantially identical reproduction of the desired features thereof using the SLA or synthetic material 36 suitably cured to corresponding rigidity. The synthetic material may be a liquid resin initially contained in a pool, with the SLA machine 30 including a suitable laser which is precisely moved to locally cure the resin in the pool to create and build the synthetic die 64.

The so fabricated synthetic die 64 conforms or matches the original component 52, particularly by duplicating accurately the internal main channel, also designated 60, the multitude of secondary channels, also designated 62, and at least the internal wall, also designated 56. The resulting synthetic die 64 therefore accurately reproduces the internal features of the original hollow component 52 within its external walls as illustrated in FIG. 7.

Figure 8:
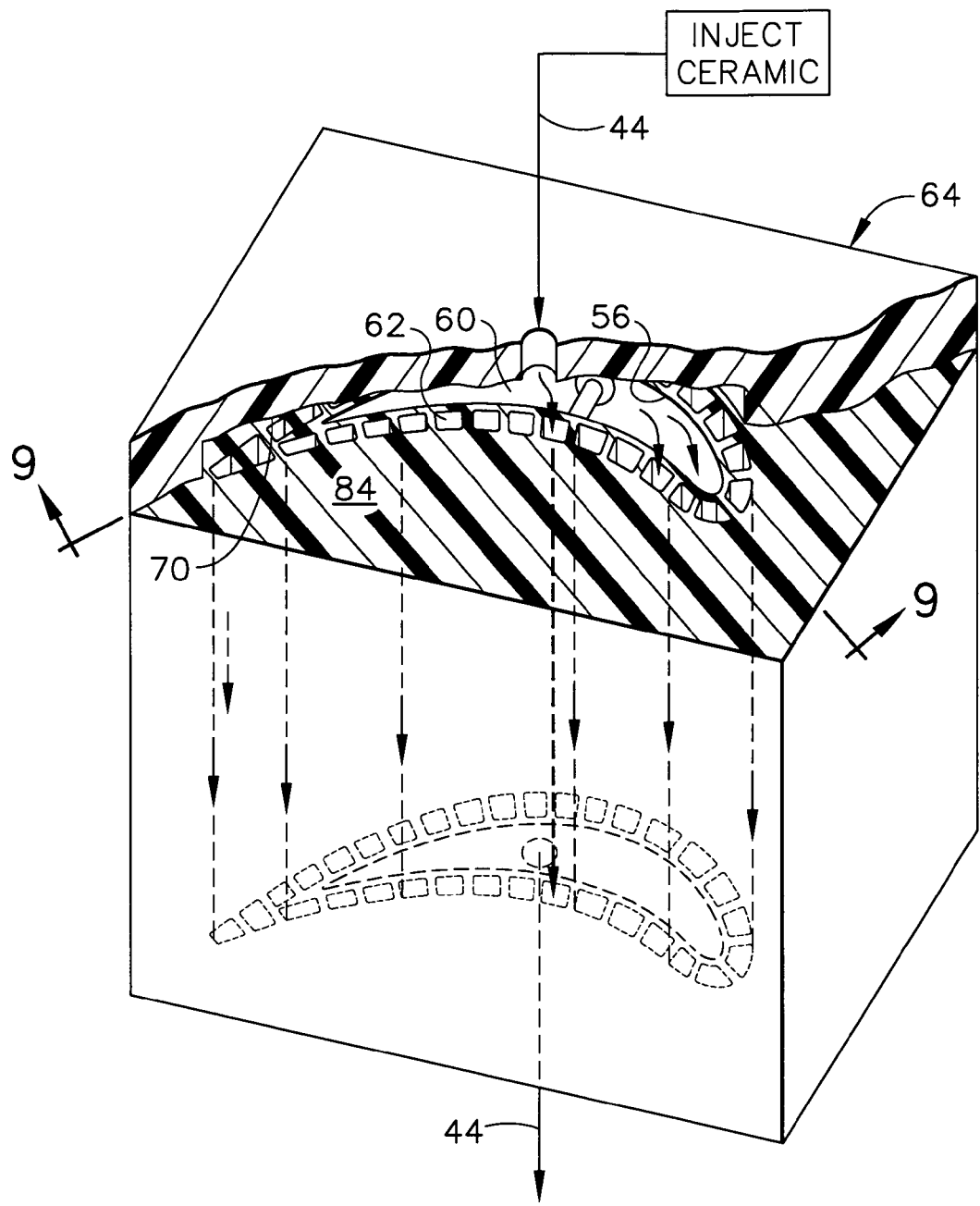
FIG. 8 is a partly sectional, isometric view of the completed synthetic die model illustrated in FIG. 7 undergoing ceramic injection therein.
Figure 9:
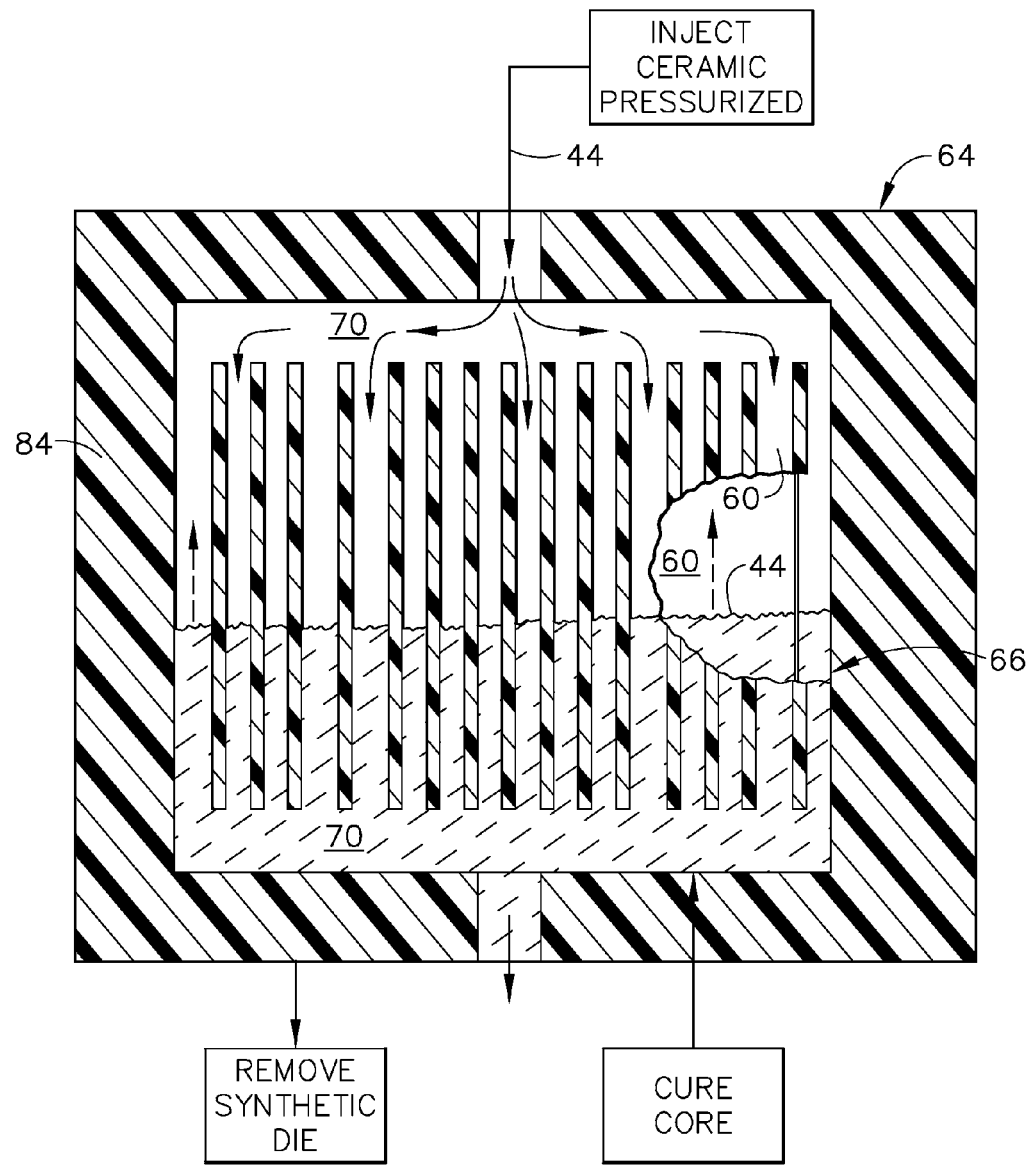
FIG. 9 is a elevational sectional view through the die model illustrated in FIG. 8 and taken along line 9-9.
Figure 10:
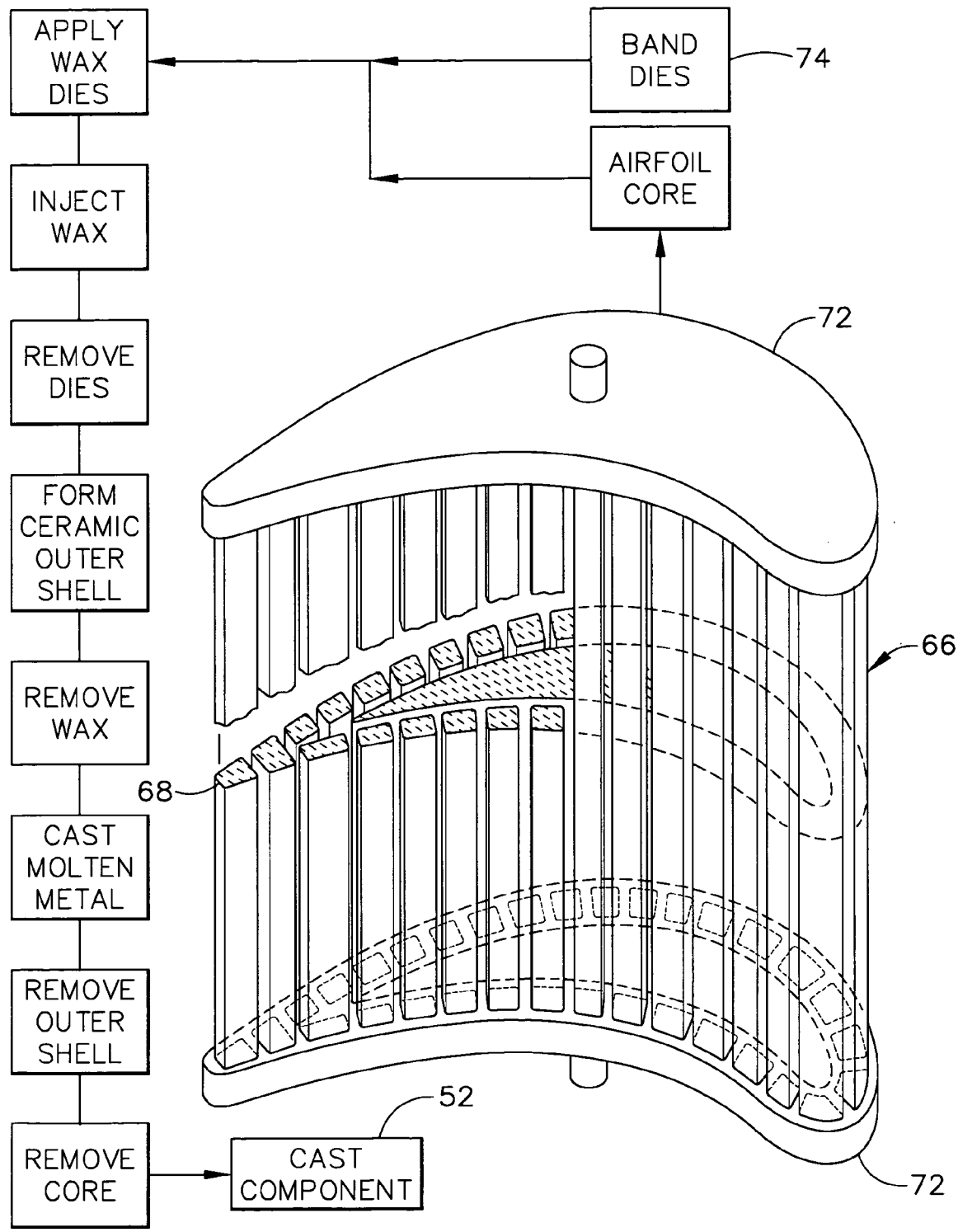
FIG. 10 is an isometric view of the ceramic core produced from the sacrificial die illustrated in FIGS. 8 and 9, along with a flowchart for the subsequent method of casting the original or authentic component illustrated at the top of FIG. 7.

Accordingly, the synthetic die 64 shown in further detail in FIGS. 8 and 9 may then be used for casting a corresponding ceramic core 66 inside the precisely formed cavities of the synthetic die 64. The synthetic die 64 may then be suitably removed from the so-cast core 66 to liberate a precisely dimensioned one-piece cast ceramic core as illustrated in FIG. 10.

As shown in FIG. 7, the specific component 52 being reproduced by casting includes at least one internal channel or cavity 60,62, although the multitude of secondary channels 62 create the specific problem of fragile ceramic core elements. The synthetic model die 64 illustrated in FIGS. 7-9 is an exact reproduction of the hollow features of the component 52 within the desired manufacturing tolerances of a few mils, and represents a positive version or image of the original component including in particular the hollow features thereof requiring a corresponding ceramic core.

The synthetic die 64 may then be suitably removed from the so cast core 66 to liberate that core as the negative or inverse version or image of the original component 52, including in particular the internal cavities inside the external wall 58.

Since the original component 52 illustrated in FIG. 7 includes the multitude of internal channels 60,62 those channels are reproduced accurately in the fabricated synthetic die 64. The cast synthetic die 64 itself is then used in FIGS. 8 and 9 to accurately cast the corresponding ceramic core 66 illustrated in liberated form in FIG. 10.

Since the core 66 is the mirror or negative version of the positive or original component 52 around the channels, the core includes a corresponding plurality of laterally spaced apart legs 68 which are relatively thin and slender, and correspondingly brittle and weak. However, the synthetic die 64 illustrated in FIG. 9 preferably also includes common plenums 70 at the opposite ends of the channels 60,62 joined in flow communication therewith.

The resulting synthetic die 64 as illustrated in FIGS. 8 and 9 is preferably a unitary or monolithic block closed solid around its perimeter, and closed at both its top and bottom walls except for a suitable inlet in the top wall and an outlet in the bottom wall through which the ceramic material 44 may be injected under pressure during the casting process. The casting material is suitably viscous or thick and requires substantial pressure for completely filling all of the narrow secondary channels 62 as well as the main central channel 60 and eliminate any voids or air pockets therein. As shown schematically in FIG. 9, the casting material fills the die 64 from bottom to top as the ceramic material is injected from top to bottom with venting through the bottom outlet.

Accordingly, the resulting ceramic core illustrated in FIG. 10 includes corresponding ceramic blocks or plates 72 integrally joined to the opposite ends of the full complement of ceramic legs 68 in a one-piece monolithic assembly. The multitude of ceramic legs 68 correspond with the multitude of secondary channels 62 which are long and slender, as well as with the main channel 60 which is relatively large and strong.

And, the two ceramic end plates 72 conform with the plenums 70 in the synthetic die 64 illustrated in FIG. 9.

Accordingly, the monolithic ceramic core 66 illustrated in FIG. 10 produced by the casting method disclosed above accurately corresponds with the multitude of internal channels in the original component 52, with each of the ceramic legs 68 being integrally formed with their supporting end plates 72 for maintaining relative accuracy between the individual legs, while also effecting enhanced strength of the monolithic core for substantially increasing its yield during the casting process. In an alternate embodiment, the legs 68 may be supported by a single one of the end plates 72 where strength permits.

After the monolithic ceramic core 66 as shown in FIG. 10 is formed in the process described above, it is suitably cured and fired at elevated temperature for use in the subsequent investment casting of the authentic component 52 in the exemplary method illustrated in FIG. 10. Investment casting, or lost-wax casting, is a well known conventional process in which the solid ceramic of the core becomes the internal channels or voids in the resulting metal component.

As shown in FIG. 10, the monolithic ceramic core 66 is configured to accurately represent the multitude of internal channels or cavities inside the final component being cast. The two end ceramic plates 72 may be used as temporary supports during the casting process. Or, the two plates 72 may be conveniently used to define corresponding manifolds in the resulting outer and inner bands 54 as desired in FIG. 7.

Figure 11:
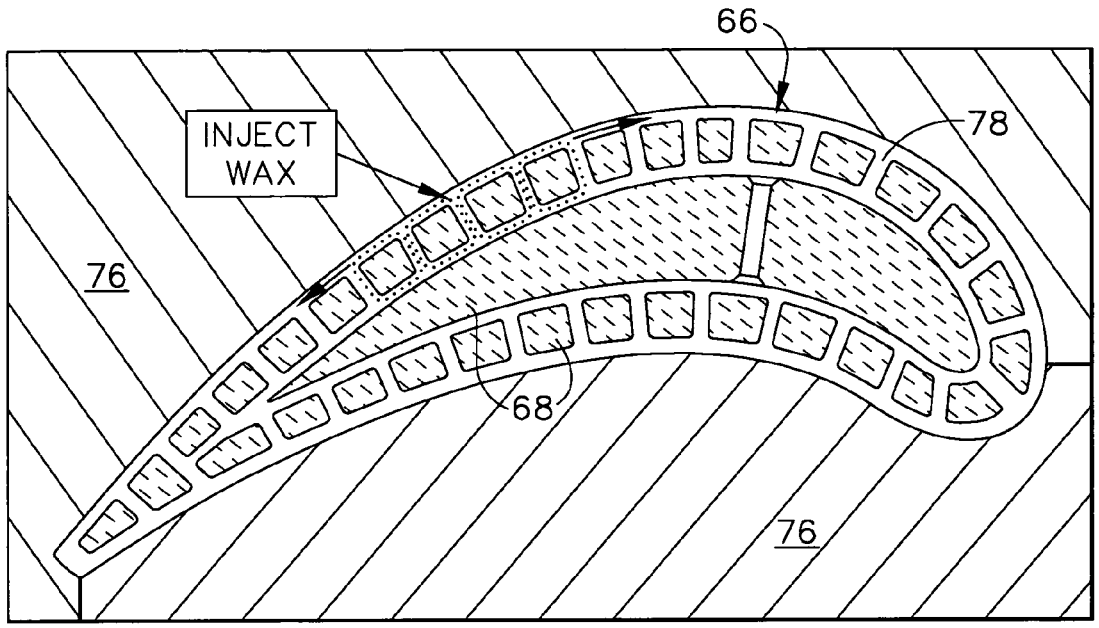
FIG. 11 is a transverse sectional view through the ceramic core illustrated in FIG. 10 disposed inside a pair of dies or molds for casting wax therein.

Accordingly, the airfoil core as represented by the monolithic core 66 is integrally assembled with corresponding dies or molds 74 at opposite ends thereof for simultaneously casting the integral outer and inner bands 54 as illustrated in FIG. 7 with the vane 52 extending therebetween. In the investment casting process, a pair of dies or molds 76 as illustrated in FIG. 11 are used to surround the vane core 66 to create a corresponding cavity or void 78 which precisely represents the 3-D configuration of the resulting metallic vane 52 being cast. The dies 74,76 are also referred to as wax dies since they confine the typical wax which is injected into the voids 78 in the molds for conforming wax to the desired configuration of the final vane and bands for each nozzle segment.

The core wax dies 76 are typically formed of metal accurately machined for typically reproducing the generally concave pressure side of the airfoil and the generally convex suction side of the airfoil with a corresponding splitline at opposite leading and trailing edges of the airfoil for permitting assembly and disassembly of the die pair around the core 66 mounted therebetween.

As illustrated schematically in FIG. 10, suitable dies or mold 74 are separately manufactured in a conventional manner for use in casting the inner and outer bands of the resulting nozzle vane, and define corresponding voids for receiving the injected wax therein.

After the wax is injected into the voids of the wax dies around the corresponding vane core, the wax sets or solidifies, and then the dies may be removed for re-use in subsequent casting operations.

Figure 12:
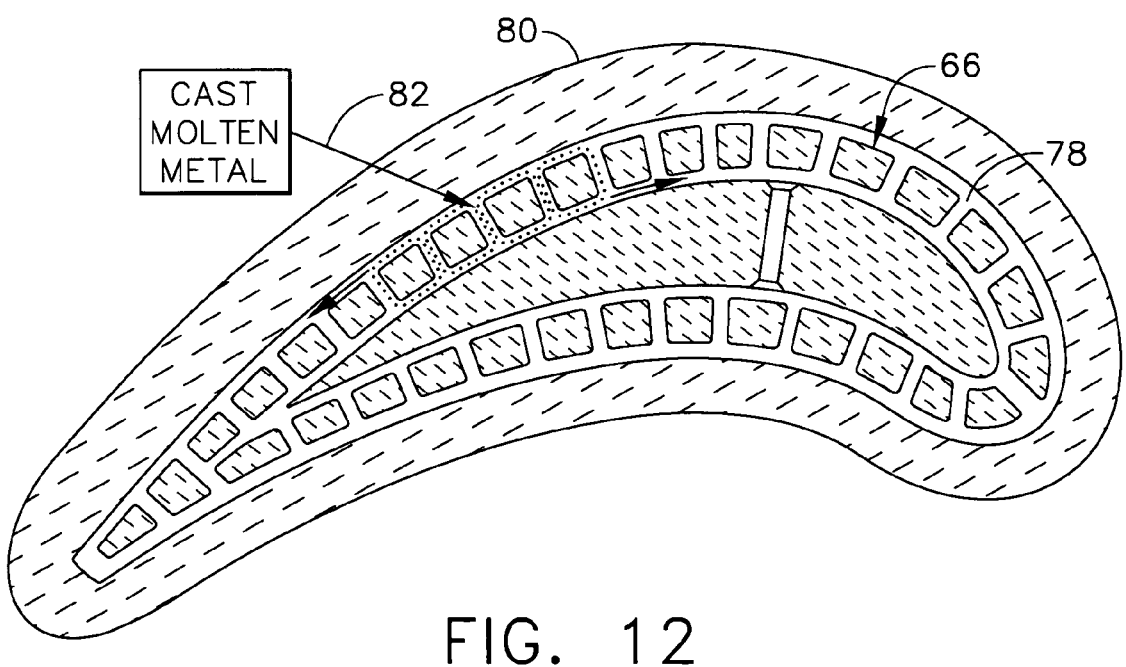
FIG. 12 is a transverse sectional view of the ceramic core illustrated in FIG. 10 having a ceramic outer shell initially formed around the molded wax which is removed and replaced by molten metal for casting the final component illustrated at the top of FIG. 7.

FIG. 10 illustrates schematically that a ceramic outer shell is then conventionally formed around the exposed wax which adheres to the ceramic core for in turn creating a relatively thick ceramic outer shell 80 around the wax as illustrated in FIG. 12. The wax may then be conventionally removed from the voids between the inner ceramic core and the outer ceramic shell, with the shell also being suitably cured.

Molten metal 82 is then conventionally poured or injected into the corresponding void 78 previously occupied by the wax for casting the metal vane component itself. For gas turbine engine rotor blades or nozzle vanes, the molten metal is typically a superalloy having enhanced strength for the hot hostile environment of the gas turbine engine, and the cast vane or blade becomes a unitary or monolithic cast component accurately reproducing the original component initially represented by the 3-D numerical model thereof and represented in turn by the 3-D synthetic model die with the corresponding internal channels thereof. The resulting cast component 52 is a substantially identical reproduction of the original component 52 as represented by its 3-D numerical model within the corresponding tolerances of the fabricating machine 30 and the casting process.

Furthermore, since the ceramic core 66 illustrated in FIG. 10, including the multitude of slender legs 68 thereof, is formed as a monolithic component which does not require assembly of the individual core legs, the specific dimensions of the individual legs and their relative placement from leg-to-leg enjoy the same precise accuracy of production due to the fabrication of the synthetic die 64 in a common fabrication process.

In the exemplary embodiment illustrated in FIG. 7, the synthetic die 64 is specifically configured for accurately reproducing the internal cavities of the vane 52 for creating the center core 66 illustrated in FIG. 10 which is then used in a conventional investment casting process with the external wax dies 76. Accordingly, the synthetic die 64 has an external wall 84 which is preferably imperforate at least along the internal channels 62 distributed around the profile of the desired vane within the envelope of the intended external wall 58 shown in phantom line in FIG. 7.

As shown in FIG. 8, the finally fabricated synthetic die 64 is preferably in the form of a monolithic or unitary block, of rectangular configuration for example, which is solid except for the required internal features of the component being cast, including the internal channels 60,62. As indicated above, the block die 64 has a suitable inlet in the top wall and suitable outlet in the bottom wall through which the ceramic material may be injected to form the resulting ceramic core therein. In this way, the core material 44 being injected into the block die 64 is fully contained therein by the surrounding synthetic external wall 84, and therefore does not require any external dies or molds, and the associated complexity and cost, as typically used in fabricating ceramic cores in a conventional manner.

Furthermore, the external wall 84 of the synthetic die 64 as illustrated in FIGS. 8 and 9 is suitably sized in thickness laterally outwardly from the longitudinally extending internal channels 60,62 around the perimeter thereof, as well as in the top and bottom portions, to withstand injection under pressure of the core material 44 through the internal channels without deforming the synthetic die itself in dimensions exceeding conformity with the component 52 being cast. Since the synthetic material 36 which forms the synthetic die 64 is typically non-metallic, it is relatively weak and is subject to substantial deformation or even rupture under pressure if the walls are made too thin.

In the exemplary embodiment illustrated in FIGS. 7 and 8, the synthetic die 64 conforms identically with the original component 52 being reproduced along the internal channels 60,62 thereof, and preferably does not conform with the original component 52 along its external wall 58. If the external wall 84 of the synthetic die 64 identically conforms with the thin external wall 58 of the original component 52, and is made with the typical weak synthetic material, it would be subject to substantial distortion and bulging during the high pressure ceramic injection process illustrated schematically in FIGS. 8 and 9 causing unacceptable distortion of the resulting ceramic core, and possible rupture of the synthetic die 64 itself.

However, the external wall 84 of the synthetic die 64 may alternatively be configured identically with the external wall 58 of the original component 52 and have a correspondingly relatively thin thickness provided the material of the synthetic die is sufficiently strong for withstanding the expected injection pressures of the ceramic material. Or, external buttresses in the general form of the wax dies 76 illustrated in FIG. 11 may be used to contain the sidewalls of the synthetic die 64 during the ceramic injection process.

As indicated above, the actual wax dies 76 themselves are not desired as external buttresses since they must be precisely machined which correspondingly increases cost of the casting process. However, similar wax dies machined with rough tolerances substantially greater than the dimensional tolerances of the external wall of the component may instead be used as buttresses or supports for the thin wall embodiment of the synthetic die 64.

However, such supports or buttresses may be eliminated, eliminating the corresponding complexity and cost thereof, by sufficiently increasing the external wall thickness of the synthetic die 64 itself depending upon the strength of the material composition thereof. In the exemplary embodiment illustrated in FIG. 7, the thickness of the external wall 84 is substantial greater than the thickness of the corresponding sidewalls of the original component 52 itself, and would typically be at least two or three times as thick, or more, as required around the perimeter of the specific configuration of the component 52, such as the airfoil, for withstanding the variation in loads or stress therein due to the pressure injection process of the ceramic material during core fabrication.

FIGS. 1-6 as disclosed above represent a first embodiment of the synthetic model casting process. FIGS. 7-12 represent a second embodiment of the synthetic model casting process. In the first embodiment, the external double wall 20 of the synthetic model 28 as illustrated in FIG. 2 conforms identically in configuration and thickness with the corresponding external wall of the turbine blade airfoil component 10, and the discrete buttresses 38 are used to support the synthetic model 28 during ceramic injection casting.

In the second embodiment illustrated in FIG. 8, the external wall 84 is substantially thicker than the corresponding sidewalls of the turbine vane component 58 for self-buttressing the synthetic die 64 during the ceramic injection process, and separate and discrete buttresses are not required. The resulting monolithic ceramic core 66 illustrated in FIG. 10 may then be used in the subsequent conventional investment, or lost wax, casting process to cast the reproduction of the original vane component 52, with its integral outer and inner bands 54.

In the first casting embodiment wherein the complete configuration of the airfoil component 12 is identically matched by the synthetic model 28, the non-lost wax casting process disclosed above may be used for first forming the shell 46 around the synthetic model after casting the core 42 therein as shown in FIG. 6. The synthetic model 28 may then be suitably removed from around the core and from inside the shell. The authentic component may then be cast around the core and inside the shell. Finally, the shell may be removed from the cast authentic component, followed by removing the internal core from inside the component to liberate the cast component 10 reproducing the original component as defined by the 3-D numerical model thereof within the small manufacturing tolerances of a few mils in the casting process disclosed.

In both embodiments, however, the specific configuration of the complex internal channels in either the blade airfoil 12 in FIG. 1 or the vane airfoil 52 in FIG. 7 may be similarly and precisely reproduced by their corresponding 3-D numerical models when fabricated in the SLA machine 30 to form the corresponding synthetic models 28 and 64.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A casting method comprising:
   creating a 3-D numerical model of a hollow component having an external wall;
   creating a synthetic model of said component from said numerical model having a corresponding synthetic external wall;
   casting a core inside said synthetic model; and
   removing said synthetic model from said core.

2. A method according to claim 1 wherein:
   said component includes an internal channel;
   said synthetic model comprises a positive version of said component including a corresponding internal channel; and
   said synthetic model is removed from said core to liberate said core as the negative version of said component inside said external wall thereof.

3. A method according to claim 2 further comprising creating a monolithic synthetic model of said component from said numerical model having said corresponding internal channel therein.

4. A method according to claim 3 further comprising:
   creating said synthetic model with an imperforate synthetic external wall along said internal channel; and
   injecting core material into said synthetic model using said external wall to contain said core material inside said channel.

5. A method according to claim 4 wherein said synthetic model conforms with said component along said channel, and does not conform with said component along said external wall thereof.

6. A method according to claim 4 wherein said synthetic model comprises a monolithic block, with said synthetic external wall being sized in thickness outwardly from said internal channel thereof to withstand injection under pressure of said core material through said channel without deforming said model in dimensions exceeding conformity with said component.

7. A method according to claim 6 wherein:
   said component includes a plurality of said internal channels therein;
   said model includes a corresponding plurality of said internal channels therein; and
   said core includes a corresponding plurality of spaced apart legs integrally joined together at one end in a monolithic assembly.

8. A method according to claim 7 further comprising:
  investment casting an authentic component around said core; and
  removing said core from inside said authentic component.

9. A method according to claim 4 wherein said external wall of said synthetic model conforms in configuration with said corresponding external wall of said component.

10. A method according to claim 9 further comprising:
  forming a shell around said synthetic model after casting said core therein;
  removing said synthetic model from around said core and from inside said shell;
  casting said authentic component around said core and inside said shell; and
  removing said shell from around said cast authentic component, and removing said core from inside said component.

11. A casting method comprising:
  creating a 3-D numerical model of a hollow component having an external wall;
  creating a synthetic model of said component from said numerical model having a corresponding synthetic external wall;
  casting a core inside said synthetic model;
  removing said synthetic model from said core;
  casting an authentic component around said core; and
  removing said core from inside said authentic component.

12. A method according to claim 11 further comprising:
  buttressing said synthetic model prior to casting said core therein; and
  injecting core material into said buttressed synthetic model to cast said core therein.

13. A method according to claim 12 further comprising buttressing said synthetic model along an external surface thereof substantially in full.

14. A method according to claim 12 further comprising buttressing said synthetic model in two complementary portions along a common splitline extending longitudinally along said synthetic model.

15. A method according to claim 12 wherein said synthetic model is buttressed by a pair of complementary buttresses encapsulating said synthetic model along a longitudinal splitline.

16. A method according to claim 15 wherein:
  said synthetic model includes an external surface having a first tolerance on dimensions thereof; and
  said buttresses include internal surfaces being complementary with said model external surface on opposite sides thereof, and said internal surfaces have a second tolerance on dimensions greater than said first tolerance.

17. A method according to claim 12 further comprising:
  forming a shell around said synthetic model after casting said core therein;
  removing said synthetic model from around said core and from inside said shell;
  casting said authentic component around said core and inside said shell; and
  removing said shell from around said cast authentic component, and removing said core from inside said component.

18. A method according to claim 17 further comprising coating said synthetic model with a coating material to form said shell therearound.

19. A method according to claim 18 wherein:
  said core material is a ceramic slurry injected into said synthetic model; and
  said shell material is a ceramic slurry coating said synthetic model.

20. A method according to claim 17 wherein:
  said synthetic model includes a hollow airfoil having main channels extending in span therethrough, and a double wall along one of said main channels having a secondary channel in flow communication with an adjacent main channel; and
  said core material is injected into said main channels and in turn into said secondary channel to form an integral core.

21. A method according to claim 11 wherein said synthetic model is created by stereolithography in which a laser beam is guided in 3-D space to locally cure a material over the boundary of said numerical model.

22. A component cast by the method of claim 11.

23. A component cast by the method of claim 12.

24. A component cast by the method of claim 15.

25. A component cast by the method of claim 17.

26. An airfoil cast by the method of claim 20.

27. A casting method comprising:
  creating a 3-D numerical model of a hollow turbine airfoil having an external sidewall;
  creating a monolithic synthetic model of said airfoil from said numerical model by depositing material in 3-D space over the boundary of said numerical model, and including a corresponding synthetic external wall;
  casting a core inside said synthetic model;
  removing said synthetic model from said core;
  casting an authentic turbine blade around said core; and
  removing said core from inside said authentic blade.

28. A method according to claim 27 further comprising:
  forming a shell around said synthetic model after casting said core therein;
  removing said synthetic model from around said core and from inside said shell;
  casting said authentic blade around said core and inside said shell; and
  removing said shell from around said cast authentic blade, and removing said core from inside said blade.

29. A method according to claim 28 further comprising:
  buttressing said synthetic model prior to casting said core therein; and
  injecting core material into said buttressed synthetic model to cast said core therein.

30. A method according to claim 29 wherein:
  said synthetic model is buttressed by a pair of complementary buttresses encapsulating said synthetic model along a longitudinal splitline;
  said synthetic model includes an external surface having a first tolerance on dimensions thereof; and
  said buttresses include internal surfaces being complementary with said synthetic model external surface on opposite sides thereof, and said internal surfaces have a second tolerance on dimensions greater than said first tolerance.

31. A method for making a casting core for a hollow component, comprising:
  manufacturing a single-piece sacrificial die using an additive layer manufacturing method, said die comprising an external wall and at least one internal cavity matching corresponding features of said component;
  introducing a ceramic slurry into said cavity of said die, said slurry comprising a ceramic and a carrier fluid;
  curing said slurry to form a monolithic ceramic casting core; and removing said sacrificial die by exposing said die to an environment adapted to destroy said die while leaving said ceramic casting core intact.

32. A method for making a hollow component having an external wall, said method comprising:

providing a single-piece sacrificial die, said die comprising an external wall corresponding with said component external wall, and at least one internal cavity; introducing a ceramic slurry into said at least one cavity of said die, said slurry comprising a ceramic and a carrier fluid;

curing said slurry to form a monolithic ceramic casting core;

removing said sacrificial die by exposing said die to an environment adapted to destroy said die while leaving said ceramic casting core intact; and performing an investment casting process using said ceramic casting core as part of a mold-core assembly to form said component.

* * * * *